US006896769B2

(12) United States Patent
Shannon et al.

(10) Patent No.: US 6,896,769 B2
(45) Date of Patent: May 24, 2005

(54) MODIFIED CONDENSATION POLYMERS CONTAINING AZETIDINIUM GROUPS IN CONJUNCTION WITH AMPHIPHILIC HYDROCARBON MOIETIES

(75) Inventors: Thomas Gerard Shannon, Neenah, WI (US); Mike Thomas Goulet, Neenah, WI (US); Daniel Arthur Clarahan, Greenleaf, WI (US); Wen Zyo Schroeder, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 380 days.

(21) Appl. No.: 09/999,717

(22) Filed: Oct. 31, 2001

(65) Prior Publication Data

US 2002/0074098 A1 Jun. 20, 2002

Related U.S. Application Data

(63) Continuation-in-part of application No. 09/488,426, filed on Jan. 20, 2000, now abandoned, and a continuation-in-part of application No. 09/488,376, filed on Jan. 20, 2000, now abandoned.
(60) Provisional application No. 60/117,162, filed on Jan. 25, 1999, and provisional application No. 60/117,163, filed on Jan. 25, 1999.

(51) Int. Cl.$^7$ .................. D21H 17/46; D21H 21/20
(52) U.S. Cl. .................. 162/164.1; 162/109; 162/111; 162/164.3; 162/164.4; 162/164.6
(58) Field of Search .................. 162/109, 111, 162/164.1, 164.3, 164.4, 164.6

(56) References Cited

U.S. PATENT DOCUMENTS

| | | |
|---|---|---|
| 2,661,349 A | 12/1953 | Caldwell et al. |
| 2,876,217 A | 3/1959 | Paschall |
| 2,926,116 A | 2/1960 | Keim |
| 2,926,154 A | 2/1960 | Keim |
| 2,995,513 A | 8/1961 | Paschall et al. |
| 3,128,311 A | 4/1964 | Shirley et al. |
| 3,152,998 A | 10/1964 | Moss |
| 3,155,728 A | 11/1964 | Lesesne |
| 3,236,792 A | 2/1966 | Curtis |
| 3,236,895 A | 2/1966 | Lee et al. |
| 3,240,721 A | 3/1966 | Fordyce |
| 3,250,664 A | 5/1966 | Coute et al. |
| 3,347,926 A | 10/1967 | Zech |
| 3,434,984 A | 3/1969 | Hyland |
| 3,436,359 A | 4/1969 | Hubin et al. |
| 3,438,970 A | 4/1969 | Chamberlain et al. |
| 3,449,886 A | 6/1969 | Connelly et al. |
| 3,511,830 A | 5/1970 | Speakman |
| 3,513,156 A | 5/1970 | Speakman |
| 3,609,126 A | 9/1971 | Yokohama et al. |
| 3,620,913 A | 11/1971 | Parmerter |
| 3,649,624 A | 3/1972 | Powers et al. |
| 3,654,370 A | 4/1972 | Yeakey |
| 3,770,472 A | 11/1973 | Jarowenko |
| 3,793,279 A | 2/1974 | Lipowski |
| 3,893,885 A | 7/1975 | Ziemann et al. |
| 3,940,519 A | 2/1976 | Helmer et al. |
| 4,014,933 A | 3/1977 | Boettger et al. |
| 4,066,495 A | 1/1978 | Voigt et al. |
| 4,153,581 A | 5/1979 | Habermann |
| RE30,193 E | 1/1980 | O'Shaughnessy |
| 4,267,059 A | 5/1981 | Behn et al. |
| 4,278,573 A | 7/1981 | Tessler |
| 4,447,498 A | 5/1984 | Fink et al. |
| 4,450,045 A | 5/1984 | Hertel et al. |
| 4,501,640 A | 2/1985 | Soerens |
| 4,521,490 A | 6/1985 | Pocius et al. |
| 4,741,804 A | 5/1988 | Solarek et al. |
| 4,764,418 A | 8/1988 | Kuenn et al. |
| 4,766,245 A | 8/1988 | Larkin et al. |
| 4,788,243 A | 11/1988 | Soerens |
| 4,801,699 A | 1/1989 | Jobe et al. |
| 4,824,689 A | 4/1989 | Kuenn et al. |
| 4,866,151 A | 9/1989 | Tsai et al. |
| 4,959,125 A | 9/1990 | Spendel |
| 4,973,680 A | 11/1990 | Billmers |
| 4,983,748 A | 1/1991 | Tsai et al. |
| 5,174,927 A | 12/1992 | Honsa |
| 5,354,425 A | 10/1994 | Mackey et al. |
| 5,518,585 A | 5/1996 | Huth et al. |
| 5,525,345 A | 6/1996 | Warner et al. |
| 5,552,020 A | 9/1996 | Smith et al. |
| 5,575,891 A | 11/1996 | Trokhan et al. |

(Continued)

FOREIGN PATENT DOCUMENTS

| | | |
|---|---|---|
| CA | 2296826 | 7/2000 |
| CA | 2296891 | 7/2000 |
| CA | 2296894 | 7/2000 |
| DE | 2 247 943 | 4/1973 |
| EP | 0 469 891 A1 | 2/1992 |
| EP | 0 620 315 A1 | 10/1994 |
| EP | 0 761 691 A2 | 3/1997 |
| WO | WO 99/12977 | 3/1999 |

OTHER PUBLICATIONS

Derwent World Patent Database abstract of SU 451,731: Description of Vladimir Synth Resi, "Cyanoethylated Starch Adhesive for Electroluminescent Lamps.".

(Continued)

*Primary Examiner*—Peter Chin
(74) *Attorney, Agent, or Firm*—Gregory E. Croft

(57) ABSTRACT

Modified condensation polymers containing azetidinium groups, such as polyamide epichlorohydrin (PAE) resins, can be combined with amphiphilic hydrocarbons containing polyethers into a single molecule to provide several potential benefits, depending upon the specific combination employed, including: (a) wet strength aids that impart softness; (b) softeners that do not reduce wet strength: (c) wet strength with improved wet/dry strength ratio; (d) surface feel modifiers with reduced linting and sloughing; (e) wet strength aids with controlled absorbency; (f) wet strength aids with controlled decay rate after wetting; and (g) Yankee dryer additives that provide surface protection and adhesion with controlled release properties.

18 Claims, No Drawings

U.S. PATENT DOCUMENTS

| | | | |
|---|---|---|---|
| 5,578,678 | A | 11/1996 | Hartmann et al. |
| 5,591,306 | A | 1/1997 | Kaun |
| 5,612,443 | A | 3/1997 | Martino et al. |
| 5,624,532 | A | 4/1997 | Trokhan et al. |
| 5,626,719 | A | 5/1997 | Tansley et al. |
| 5,656,746 | A | 8/1997 | Smith et al. |
| 5,716,692 | A | 2/1998 | Warner et al. |
| 5,717,087 | A | 2/1998 | Kalbe et al. |
| 5,746,887 | A | 5/1998 | Wendt et al. |
| 5,770,711 | A | 6/1998 | Greene et al. |
| 5,772,845 | A | 6/1998 | Farrington, Jr. et al. |
| 5,785,813 | A | 7/1998 | Smith et al. |
| 5,856,299 | A | 1/1999 | Righetto et al. |
| 5,958,187 | A | 9/1999 | Bhat et al. |
| 6,059,928 | A | 5/2000 | Van Luu et al. |
| 6,090,242 | A | 7/2000 | Drummond et al. |
| 6,126,784 | A | 10/2000 | Ficke et al. |
| 6,153,053 | A | 11/2000 | Harper et al. |
| 6,190,678 | B1 | 2/2001 | Hasenoehrl et al. |
| 6,193,843 | B1 | 2/2001 | Tsai et al. |
| 6,204,254 | B1 | 3/2001 | Nelson et al. |
| 6,207,012 | B1 | 3/2001 | Oriaran et al. |
| 6,207,013 | B1 | 3/2001 | Oriaran et al. |
| 6,224,714 | B1 | 5/2001 | Schroeder et al. |
| 6,235,155 | B1 | 5/2001 | Schroeder et al. |
| 6,287,418 | B1 * | 9/2001 | Schroeder et al. .......... 162/112 |
| 6,517,678 | B1 | 2/2003 | Shannon et al. |
| 2002/0015854 | A1 | 2/2002 | Billmers et al. |
| 2002/0053412 | A1 | 5/2002 | Schroeder et al. |
| 2002/0134521 | A1 | 9/2002 | Shannon et al. |

OTHER PUBLICATIONS

Burr, R.C., et al., "Starch Graft Copolymers for Water Treatment," *Die Starke*, 27, nr. 5, 1975, pp. 155–159.

Cheng, W.C., et al., "O–Carboxymethylstarch Amine Polyampholytes as Papermaking Additives," *Starch/Stärke*, vol. 30, No. 8, Aug. 1978, pp. 280–282.

Farewell, John, Editor, *Commercially Available Chemical Agents for Paper and Paperboard Manufacture*, Fourth Edition, Tappi Press, 1990, pp. 5–6.

Hamerstrand, G.E., et al., "An Evaluation of Cationic Aminoethyl Cereal Flours as Wet–End Paper Additives," *Tappi*, vol. 58, No. 1, Jan. 1975, pp. 112–115.

Heath, H.D., et al., "Flocculating Agent–Starch Blends for Interfiber Bonding and Filler Retention: Comparative Performance With Cationic Starches," *Tappi*, vol. 57, No. 11, Nov. 1974, pp. 109–111.

Lindsay, William F., "Absorbent Starch Based Co–polymers—Their Characteristics and Applications," *Formed Fabrics Industry*, 8(5), 1977, pp. 20, 24, 26.

Van Beynum, G.M.A., editor, *Starch Conversion Technology*, Marcel Dekker, Inc., New York, 1985, pp. 92–93.

\* cited by examiner

MODIFIED CONDENSATION POLYMERS CONTAINING AZETIDINIUM GROUPS IN CONJUNCTION WITH AMPHIPHILIC HYDROCARBON MOIETIES

This application is a continuation-in-part of application Ser. No. 09/488,426 filed Jan. 20, 2000, now abandoned, which application claims priority to Ser. No. 60/117,162 filed Jan. 25, 1999 and application Ser. No. 09/488,376 filed Jan. 20, 2000, now abandoned, which application claims priority to Ser. No. 60/117,163 filed Jan. 25, 1999.

BACKGROUND OF THE INVENTION

In the manufacture of paper products, such as facial tissue, bath tissue, paper towels, dinner napkins and the like, a wide variety of product properties are imparted to the final product through the use of chemical additives. Examples of such additives include softeners, debonders, wet strength agents, dry strength agents, sizing agents, opacifiers and the like. In many instances, more than one chemical additive is added to the product at some point in the manufacturing process. Unfortunately, there are instances where certain chemical additives may not be compatible with each other or may be detrimental to the efficiency of the papermaking process, such as can be the case with the effect of wet end chemicals on the downstream efficiency of creping adhesives. Another limitation, which is associated with wet end chemical addition, is the limited availability of adequate bonding sites on the papermaking fibers to which the chemicals can attach themselves. Under such circumstances, more than one chemical functionality compete for the limited available bonding sites, oftentimes resulting in the insufficient retention of one or both chemicals on the fibers.

Therefore, there is a need for a means of applying more than one chemical functionality to a paper web that mitigates the limitations created by limited number of bonding sites. More specifically, there is a need to provide resins combining the humectancy of a polyether with the ability to form crosslinked thermoset resins such that these materials will function effectively as wet strength agents for tissue.

SUMMARY OF THE INVENTION

It has been discovered that two or more chemical functionalities can be combined into a single molecule, such that the combined molecule imparts at least two distinct product properties to the final paper product that heretofore have been imparted through the use of two or more different molecules. More specifically, certain amphiphilic hydrocarbons can be incorporated into the backbone of modified condensation polymers containing azetidinium groups or other such groups capable of either crosslinking with cellulose or the polymer molecules themselves, such as polyamide epichlorohydrin (PAE) resins, into a single molecule that provides several potential benefits, depending upon the specific combination employed, including: (a) wet strength aids that impart softness; (b) softeners that do not reduce wet strength: (c) wet strength with improved wet/dry strength ratio; (d) surface feel modifiers with reduced linting and sloughing; (e) wet strength aids with controlled absorbency; (f) wet strength aids with controlled decay rate after wetting; and (g) Yankee dryer additives that provide surface protection and adhesion with controlled release properties.

Hence in one aspect, the invention resides in a condensation polymer comprising the reaction product of two or more reactant compounds which include an amphiphilic difunctional polyoxyalkylene compound, a difunctional polyalkylene compound having at least one unreacted secondary amine group and, optionally, a difunctional saturated aliphatic hydrocarbon or a difunctional ether, wherein at least a portion of the secondary amine groups in the resulting condensation polymer have been reacted to incorporate groups capable of forming covalent bonds with cellulose or with other polymer molecules.

More specifically, the invention resides in condensation polymers having the following general structure:

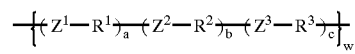

where
a, b, w≧1;
c≧0;
$Z^1$, $Z^2$, $Z^3$=bridging radicals including —OOC—, —COO—, —NHCO—, —OCNH—, —O—, —S—, —CONHCO—, —NCOO—, —OSO$_2$O—, OCOO, —OOC—Ar—O—, or any other suitable bridging radical. $Z^1$, $Z^2$, $Z^3$ can be the same or different. The purpose of the $Z^1$, $Z^2$, $Z^3$ radicals is to incorporate the $R^1$, $R^2$, and $R^3$ groups into the polymer. The Z groups can also contain aryl functionality.
$R^1$=an amphiphilic hydrocarbon residue derived from a polyether;
$R^2$=a linear or branched, saturated or unsaturated, substituted or non-substituted aliphatic hydrocarbon containing at least one secondary amine group wherein at least a portion of the secondary amine groups in the final polymer have been reacted in such a manner so as to incorporate groups capable of forming covalent bonds either with cellulose or with other polymer molecules; and
$R^3$=a linear or branched, substituted or non-substituted aliphatic hydrocarbon having from about 1 to 24 carbon atoms including mixtures of said compounds. $R^3$ can also be a bis-functional ether of a linear or branched, substituted or non-substituted saturated aliphatic hydrocarbon having from 2 to 24 carbons.

A feature of the condensation polymers of this invention is that the amphiphilic polyether portion of the polymer ($R^1$) is built into the backbone of the polymer and not pendant to the main polyamidoamine chain. By incorporating the polyether portion in a linear fashion into the backbone of the polymer, branching and crosslinking are minimized, thus making the polymers of this invention well-suited for use as wet strength agents.

In another aspect, the invention resides in a tissue or towel sheet, comprising an amount of a condensation polymer as described above.

In another aspect, the invention resides in a method of making a paper sheet such as a tissue or towel sheet, comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a condensation polymer is added to the aqueous suspension, said condensation polymer having the structure described above.

The amount of the condensation polymer of this invention added to the fibers can be from about 0.01 to about 3 weight percent, on a dry fiber basis, more specifically from about 0.02 to about 2 weight percent, and still more specifically from about 0.05 to about 1.5 weight percent. The modified condensation polymer(s) can be added to the fibers at any point in the process where the fibers are suspended in water.

Methods of making paper products which can benefit from the various aspects of this invention are well known to those skilled in the papermaking art. Exemplary patents include U.S. Pat. No. 5,785,813 issued Jul. 28, 1998 to Smith et al. entitled "Method of Treating a Papermaking Furnish For Making Soft Tissue"; U.S. Pat. No. 5,772,845 issued Jun. 30, 1998 to Farrington, Jr. et al. entitled "Soft Tissue"; U.S. Pat. No. 5,746,887 issued May 5, 1998 to Wendt et al. entitled "Method of Making Soft Tissue Products"; and U.S. Pat. No. 5,591,306 issued Jan. 7, 1997 to Kaun entitled "Method For Making Soft Tissue Using Cationic Silicones", all of which are hereby incorporated by reference.

DETAILED DESCRIPTION OF THE INVENTION

The condensation polymers of this invention comprise the reaction product of an amphiphilic difunctional polyoxyalkylene compound and a difunctional polyalkylene compound having at least one unreacted secondary amine group and, optionally, a saturated aliphatic difunctional hydrocarbon or ether. In addition, a portion of the secondary amine groups have been reacted in such a manner as to incorporate groups capable of forming covalent bonds either with cellulose or with other polymer molecules.

In preparing the condensation polymers of this invention, the amphiphilic difunctional polyoxyalkylene compound has the formula:

$$Z^5\text{-}R^1\text{-}Z^6$$

wherein $Z^5$ and $Z^6$ are functional groups, which can be the same or different, such that each Z-group must be capable of reacting with at least one other Z-group in order to incorporate the R-group functionality into the molecule; and $R^1$ is defined as above.

The polyoxyalkylene component as referred to herein is derived from polyethers and in one embodiment has a structure:

$$\text{---}(R^7O)_h\text{---}$$

wherein $R^7$=saturated, linear or branched, substituted or non-substituted aliphatic hydrocarbons having 10 or fewer carbon atoms; and $h \geq 2$.

The polyoxyalkylene structure can also exist as a series of independently different aliphatic hydrocarbon ether units. The individual units may be arranged in any fashion within the polyether structure. Such compounds will have the formula:

$$\text{---}[(R^8O)_j\text{---}(R^9O)_k\text{---} \ldots \text{---}(R''O)_z\text{---}]_w\text{---}$$

wherein:

$R^8$, $R^9$, $R''$=saturated, linear or branched, substituted or non-substituted aliphatic hydrocarbon of 10 or fewer carbon atoms;

j, k ... z $\geq 0$ such that the sum of j, k ... z is $\geq 1$; and w $\geq 1$.

The difunctional polyalkylene component having at least one unreacted secondary amine group has the formula:

$$Z^7\text{-}R^2\text{-}Z^8$$

wherein $Z^7$ and $Z^8$ are functional groups, which can be the same or different, such that each Z-group must be capable of reacting with at least one other Z-group in order to incorporate the R-group functionality into the molecule; and $R^2$ is defined as above.

The optional difunctional saturated aliphatic hydrocarbon or difunctional ether has the following structure:

$$Z^9\text{-}R^3\text{-}Z^{10}$$

wherein $Z^9$ and $Z^{10}$ are functional groups, which can be the same or different, such that each Z-group must be capable of reacting with at least one other Z-group in order to incorporate the R-group functionality into the molecule; and $R^3$ is defined as above.

Examples of suitable functional Z-groups described above include, but are not limited to: —COOH, —COOR$^4$, —COX, —OCH$_2$COOH, —OCH$_2$COOR$^4$, —OCH$_2$COX, —NH$_2$, —OH, —SH, —OCOX, —OCOOR$^4$, —CN, —NCO, and the like;

wherein $R^4$=methyl or ethyl and "X"=halogen.

Examples of suitable amphiphilic hydrocarbon residues derived from a polyether ($R^1$) include, but are not limited to, structures such as:

$$\text{---}(\underset{R^5}{\underset{|}{C}HCH_2O})_{\overline{a}}\text{---}[(CH_2)_xO]_{\overline{b}}\text{---}(\underset{R^6}{\underset{|}{C}H_2CH})_{\overline{c}}\text{---}$$

where:

$R^5$, $R^6$=independently H or CH$_3$;

a, b, c $\geq 0$;

a+b+c $\geq 2$; and x=2 to 6.

Examples of suitable aliphatic hydrocarbon residues containing at least one secondary amine group ($R^2$) include, without limitation, the following structures:

$$\text{---}(C_nH_{2n}NH)_x\text{---}C_nH_{2n}\text{---}$$

where "n" is an integer of 2 or greater and "x" is an integer of 1 or greater.

Examples of suitable difunctional polyalkylene compounds having at least one unreacted secondary amine group ($Z^7$-$R^2$-$Z^8$) include, without limitation, the following structures:

NH$_2$—(C$_n$H$_{2n}$NH)$_x$—H

NH$_2$CH$_2$CH$_2$NHCH$_2$CH$_2$NH$_2$

HOOCCH$_2$NHCH$_2$COOH

HOCH$_2$CH$_2$NHCH$_2$CH$_2$OH

NH$_2$CH$_2$CH$_2$NHCH$_2$CH$_2$OH

HOOCCH$_2$CH$_2$NHCH$_2$CH$_2$COOH

NH$_2$CH$_2$CH$_2$NHCH$_2$CH$_2$NHCH$_2$CH$_2$NH and

HN(CH$_2$CH$_2$CN)$_2$ wherein "n" and "x" are integers of 2 or more.

Examples of suitable difunctional saturated aliphatic hydrocarbons and difunctional ethers ($Z^9$-$R^3$-$Z^{10}$) include, but are not limited to, adipic acid, malic acid, malonic acid, glutaric acid, oxalic acid, succinic acid, methyl malonic acid, citramalic acid, 2-methylglutaric acid, 3-methylglutaric acid, dimethylglutaric acid, pimelic acid, suberic acid, azelaic acid, sebacic acid, undecanedioc acid, dodecanedioc acid, 1,12-dodecanedicarboxylic acid, hexadecanedioc acid, octadecanedioc acid, dodecyldioic acid, diglycolic acid, their corresponding methyl and ethyl esters, acid chlorides and mixtures of said compounds.

With regard to reaction of the secondary amine groups to add groups capable of forming covalent bonds with cellulose or other polymer molecules, such reactions of the secondary amine group are well known to those skilled in the art. Preferred functional groups are azetidinium, epoxy, silanol and mixtures of said groups. A key element in this regard is that the reaction take place in such a way that crosslinking between individual polymer molecules is kept to a minimum prior to addition of the polymer to the cellulose.

In order to use the condensation polymers of this invention as wet strength agents, it is desirable to insure that the crosslinking reaction between polymer molecules is appreciably minimized until after addition to the pulp fibers and sheet formation. Pre-crosslinked high molecular weight and highly branched versions find a variety of uses as flocculation and drainage aids, retention aids and sundry other process aid applications but are generally not suitable for wet strength applications where essentially linear resins are preferred. For wet strength resins, molecular weights can be about 1,000,000 or lower, more specifically about 500,000 or lower, and still more specifically from about 10,000 to about 250,000.

Difunctional polyoxyalkylene compounds typically have free hydroxyl groups at the terminal ends of the polymer wherein $Z^5$ and $Z^6$ are —OH. The —OH groups are capable of undergoing condensation reactions to form polymers and thus are suitable for incorporation into the polymers of the invention. There are derivatives of these compounds including the dithiol, diisocyanate, diacid and diamine derivatives which are also suitable and may be preferred for incorporation of the polyoxyalkylene element into the polymer backbone. Both the diacid, $Z^5$, $Z^6$=—$OCH_2COOH$, and diamine derivatives, $Z^5$, $Z^6$=—$NH_2$ are known commercially available materials. One especially preferred class of difunctional polyoxyalkylene compounds is the amino functional polyethers, often referred to as polyalkyleneoxy amines. The polyalkyleneoxy amines are well known compositions that may be prepared by the reductive amination of polyalkyleneoxy alcohols using hydrogen and ammonia in the presence of a catalyst. This reductive amination of polyols is described in U.S. Pat. Nos. 3,128,311; 3,152,998; 3,236,895; 3,347,926; 3,654,370; 4,014,933; 4,153,581 and 4,766,245. The molecular weight of the polyalkyleneoxy amine material, when employed is preferably in the range of from about 100 to about 5,000. Additional examples of amine containing polymers having carbon—oxygen backbone linkages and their uses are described in U.S. Pat. Nos. 3,436,359; 3,155,728; and 4,521,490. Examples of suitable commercially available polyalkyleneoxy amines are materials sold under the trade name Jeffamine® and manufactured by Huntsman Chemical Corporation.

On a molar basis, the ratio of the various components in the polymer will vary depending upon the specific compounds and synthesis strategies employed. Ratios of reactive end groups are typically 1:1 molar although slight molar excesses are often used. On a weight basis, the amount of polyether will range from about 2 to about 95 weight percent of the total polymer, more specifically from about 5 to about 80 weight percent, and still more specifically from about 10 to about 60 weight percent.

It will oftentimes be advantageous to incorporate the optional saturated aliphatic hydrocarbon residue, $R^3$, into the backbone of the polyamidoamine along with the polyoxyalkylene element. The optional saturated aliphatic hydrocarbon can be linear or branched, substituted or non-substituted aliphatic having from about 1 to 24 carbon atoms. It may also be advantageous to including mixtures of said aliphatic hydrocarbons and such embodiment should be considered within the scope of the invention. $R^3$ may also be a bisfunctional ether of a linear or branched, substituted or non-substituted aliphatic hydrocarbon having from 2 to 24 carbons. The bis-functional ethers being distinct from the di-functional polyoxyalkylene derivatives in that the polyoxyalkylene derivatives are characterized by having a multiplicity of ether groups whereas the bis-functional ethers contain only one such ether group. As such, the bis-functional ethers do not demonstrate the humectant properties of the polyoxyalkylene materials, instead behaving more like a saturated aliphatic hydrocarbon.

There are a variety of ways in which the saturated aliphatic hydrocarbon can be incorporated into the backbone of the polymer. A preferred approach is to use a dibasic acid, acid halide, methyl ester, or ethyl ester of a saturated aliphatic hydrocarbon having from 2 to 24 carbon atoms. The most preferred approach is to use the dibasic acid.

Examples of suitable dibasic acids of aliphatic hydrocarbons and bis-functional ethers include but are not limited to, adipic acid, malic acid, malonic acid, glutaric acid, oxalic acid, succinic acid, methyl malonic acid, citramalic acid, 2-methylglutaric acid, 3-methylglutaric acid, dimethylglutaric acid, pimelic acid, suberic acid, azelaic acid, sebacic acid, undecanedioc acid, dodecanedioc acid, 1,12-dodecanedicarboxylic acid, hexadecanedioc acid, octadecanedioc acid, dodecyldioic acid, diglycolic acid, their corresponding methyl and ethyl esters, acid chlorides and mixtures of said compounds. The amount of difunctional aliphatic hydrocarbon relative to difunctional polyoxyalkylene compound will vary depending upon the particular application. In general the amount of difunctional aliphatic hydrocarbon will range from 0% to about 98% by weight of the amount of difunctional polyoxyalkylene compound, more specifically from about 10% to about 95% and most specifically from about 20% to about 85% by weight of the amount of difunctional polyoxyalkylene compound.

The reaction of the difunctional polyalkylene compound having at least one unreacted secondary amine group, the difunctional polyoxyalkylene compound, and optional saturated aliphatic difunctional hydrocarbon can be done by any of the various methods known to those skilled in the art. A typical reaction involves adding the various reactants into a reaction vessel, heating the reaction vessel to an elevated temperature in excess of 100° C., typically from around 150° C. to around 250° C., optionally under a nitrogen atmosphere, and removing the by-products of the condensation reaction, usually water. Reaction takes place until by-product removal is complete. Catalysts, vacuum and other process techniques can be employed to help drive the reaction to completion. The molecular weight of the polymer can be controlled by controlling the extent of reaction, the extent of reaction monitored by measuring the amount of by-product evolved and comparing to the 100% theoretical amount. Such techniques are well known to those skilled in the art. Molecular weight may also be controlled via addition of mono-functional additives, again such techniques being well known to those skilled in the art. Both intermediate condensation polymer and finished product formulation may include biocides, antioxidants, and other aids to improve storage and handling capabilities. Such variations should be understood to be within the scope of the invention.

Formation of the crosslinking entity takes place after the formation of the polyamidoamine is complete. Reaction with epichlorohydrin to form hydroxy azetidinium groups, for example, can be accomplished using the following procedure. The polyamidoamine polymer is diluted with water to a concentration of about 10% to about 70% solids, preferably from about 10% to about 30% solids. From about 0.05 to about 1.2 molar equivalents, preferably from about 0.10 to about 0.8 molar equivalents, of epichlorohydrin based on secondary amine content of the base resin is added to the aqueous solution at a temperature of 60° C. or lower. Reaction continues until a substantial amount of the epichlorhydrin, typically 60–100% has reacted. While maintaining a temperature between 20° C. and 100° C., Sulfuric acid or other mineral acid is added at a rate of from about 0.1 to about 30% of an equivalent based on the amount of secondary amine in the starting polyamidoamine. Reaction is then continued at a temperature between 20° C. and 100° C., preferably from about 20° C. to 80° C. to affect isomerization of N-chlorohydrin groups to 3-hydroxyazetidinium groups. Some crosslinking may occur during this reaction but should be minimized through careful selection of reaction temperatures, pH and concentration of the polymer in solution.

Typically, only a portion of the secondary amine groups are functionalized with the crosslinking moiety. Preferably from about 5 to about 60% of the secondary amine groups have been functionalized, most preferably from about 10 to about 50%. Higher levels of functionalization up to 100% can be used provided the crosslinking groups are capable of forming covalent bonds with cellulose.

When the condensation polymers of this invention are PAE resins, the polymers of this invention are expected to show the same traits as standard commercially available PAE wet strength resins such as Kymene 557 manufactured and sold by Hercules, Inc. As such they would be expected to be stabilized by acidification to a pH of 3.5–6.0 at the end of the polymerization reaction and generally shipped/stored as aqueous solutions of 12–33% solids. As with other PAE resins, they are thermosets and they will polymerize with themselves to water insoluble materials by action of heat alone.

In papermaking systems, typical addition levels will be on the order of 0. 10% to 4.0% by weight of dry fiber, more specifically from about 0.2% to 3.0% by weight of dry fiber. They should be effective when employed across a pH range of 5–9. Best resin distribution will be achieved when the resin solution is diluted at least 10:1 with fresh water. Active chlorine will react with PAE resins to reduce their effectiveness. At low pH resins are less effective due to inadequate ionization of the pulp carboxyl groups and also the secondary amine groups become protonated and can not readily participate in cross linking reactions with azetidinium groups.

Crosslinking groups are not limited to hydroxyazetidinium. It is known that the polyamidoamines can also be reacted in a manner to give other functional groups capable of crosslinking with other polymer molecules or cellulose. In particular it is known that silanol and epoxy groups can be added to the polymer backbone and can be done with or without presence of hydroxyazetidinium groups. Such groups should also be recognized as falling within the scope of the invention as well as mixtures of said groups.

The reaction between PAE and anionic materials has been disclosed and can be beneficial in enhancing resin retention by fibers. This is illustrated by the use of anionic carboxymethyl cellulose in conjunction with PAE resin to improve wet strength performance. In this case it is believed that the CMC and PAE resin form a weakly cationic complex called a "symplex" that absorbs onto fiber surfaces. The CMC provides the carboxyl groups necessary to attract more PAE onto the fiber surface. It is expected that the resins of this invention would behave similarly and it is within the scope of the invention to use such materials as CMC in conjunction with the polymers of the invention to improve wet strength performance.

Where enhanced cationicity is desired, difunctional compounds containing tertiary amine groups may also be employed. These tertiary amine groups are capable of being quaternized via reaction with epichlorohydrin as is routinely done with cationic starches, however, they can not be isomerized to hydroxyazetidinium groups.

One skilled in the art will recognize that in the aforementioned process the polyoxyalkylene entity will be incorporated into the polymer backbone in a random manner. It may at times be advantageous to incorporate the amphiphilic hydrocarbon moiety as a block copolymer into the backbone of the polymer. This may be accomplished via a mono- or di-substituted copolymer containing linear or branched, substituted or unsubstituted, saturated or unsaturated, amphiphilic hydrocarbon moieties. Finished polymers will have a structure.

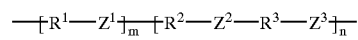

wherein
m=1 to 5000;
n=10 to 5000;
and $R^1$, $R^2$, $R^3$, $Z_1$, $Z^2$ and $Z^3$ are as defined above.

EXAMPLES

Example 1

75 grams (0.3 moles) of poly(ethylene glycol) bis (carboxymethyl) ether having a molecular weight of 250 grams, 102 grams (0.7 moles) of adipic acid and 114 grams (1.1 moles) of diethylene triamine are charged to a three-neck flask equipped with a mechanical stirrer, thermometer and water trap. The solution is heated to 160° C. for 105 minutes as the temperature rises to around 195° C. The contents of the flask are poured into a large beaker and cooled to room temperature. The resultant polyamidoamine is then dissolved in approximately 600 cc of water to make a 30% solids solution. The solution is charged to a 3 neck flask equipped with a condenser, mechanical stirrer and addition funnel. The solution is heated to 40° C. and 47 grams (0.5 moles) of epichlorhydrin are added at a rate so as to maintain the temperature between 40° C. and 50° C. After addition is complete, the epichlorhydrin is allowed to react for an additional 120 minutes at a temperature between 40° C. and 45° C. 550 cc of a 2% w/w sulfuric acid solution are added and the temperature is raised to 60° C. and the reaction is allowed to continue for an additional 90 minutes. The pH is then adjusted to between 3.5 and 6 and the solids content adjusted to 5–15%. The overall reaction is shown in FIG. 1.

FIG. 1

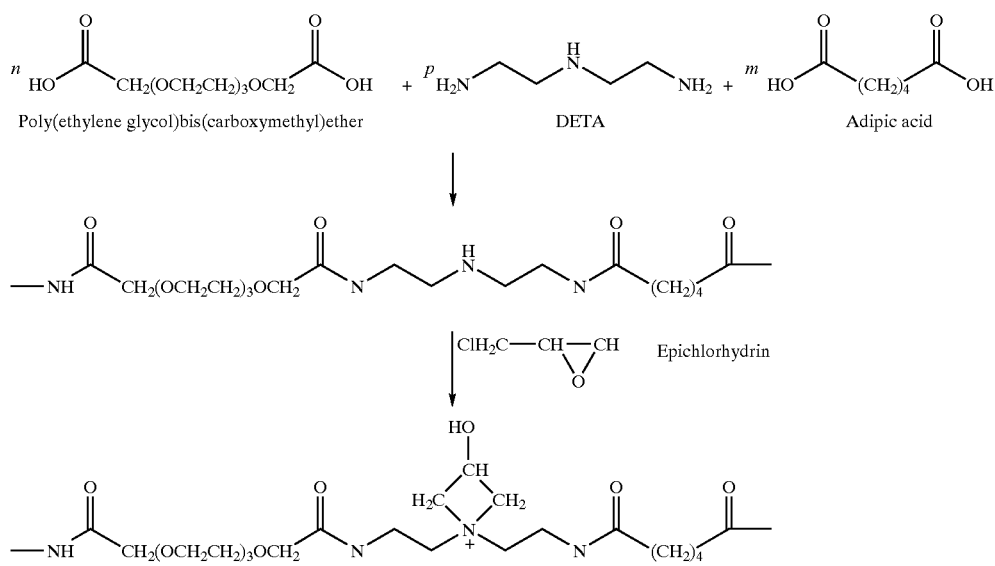

wherein:
m, n and p are moles of respective compound such that:
m, n, p>0; and
m+n=0.8–1.2 p.

Example 2

This example illustrates the reaction between a polyoxyalkylene diamine, a dibasic acid of an aliphatic hydrocarbon and a polyamine. 146 grams (1.0 moles) of adipic acid, 84 grams (0.8 moles) of diethylene triamine and 180 grams (0.3 moles) of Jeffamine ED-600® (a commercially available poly(oxyalkylene) diamine having the formula set forth in FIG. 2 below wherein a+c=about 2.5 and b=about 8.5) are charged to a 3-neck reaction flask equipped with a mechanical stirrer, thermometer and water trap condenser. The solution is heated to 160° C. and the reaction is allowed to proceed until about 85% of the theoretical water is removed. The contents of the flask are then poured into a large beaker and allowed to cool to room temperature. Distilled water is added to bring the solution to about 40% solids. The polymer solution is then charged to a reaction flask equipped with a condenser, mechanical stirrer and addition funnel. The solution is heated to 40° C. and 42 grams (0.45 moles) of epichlorhydrin are added at a rate so as to maintain the temperature between 40° C. and 50° C. After addition is complete, the epichlorhydrin is allowed to react for an additional 120 minutes at a temperature between 40° C. and 45° C. 550 cc of a 2% w/w sulfuric acid solution are added and the temperature is raised to 60° C. and the reaction is allowed to continue for an additional 90 minutes. The pH is then adjusted to between 3.5 and 6 and the solids content adjusted to 5–15%. The overall reaction is shown in FIG. 2 below.

FIG. 2

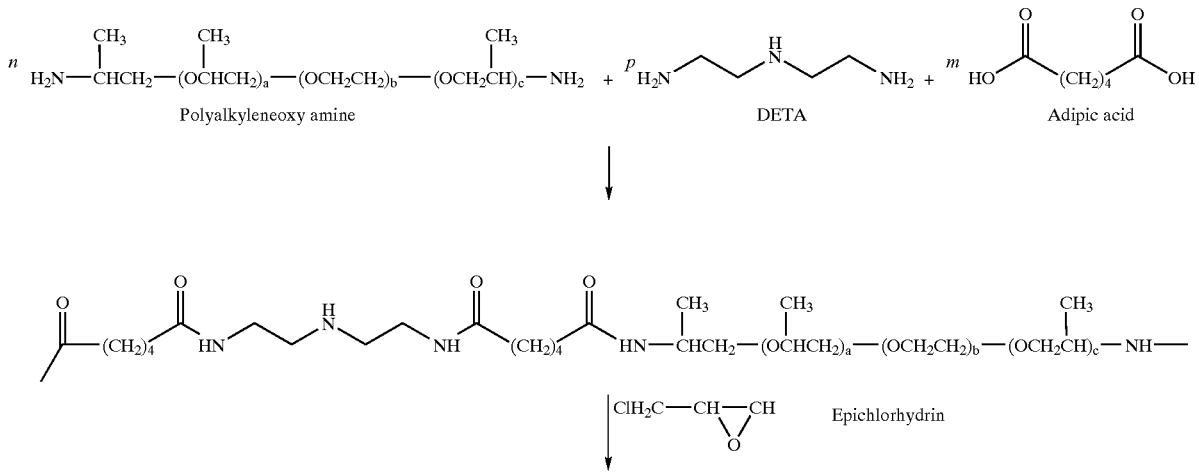

-continued

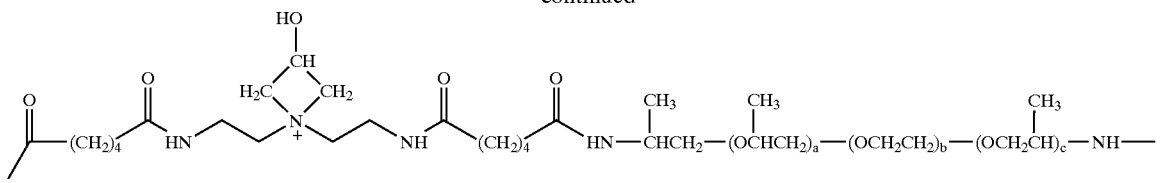

wherein:
m, n, p>0;
n+p=m;
a+c=2.5; and
b=8.5.

Example 3

This example illustrates the use of the condensation polymer of this invention to modify cellulosic sheets. 50 grams (oven-dry basis) of a blend of 65% Eucalyptus hardwood Kraft fiber and 35% by weight Northern Softwood Kraft fiber is soaked in 2 liters of water for 5-minutes. The pulp slurry is then disintegrated for 5 minutes in a British disintegrator. The slurry is then diluted with water to a volume of 8 liters. The chemical of example 2 is diluted to a 1% by weight solution and 25 grams of the 1% polymer solution is added to the pulp slurry to give a chemical concentration of 0.5% by weight of dry fiber. The slurry is mixed with a standard mechanical mixer at moderate shear for 10 minutes after addition of the first chemical.

Handsheets are made with a basis weight of 60 gsm. During handsheet formation, the appropriate amount of fiber (0.625% consistency) slurry required to make a 60 gsm sheet is measured into a graduated cylinder. The slurry is then poured from the graduated cylinder into an 8.5-inch by 8.5-inch Valley handsheet mold (Valley Laboratory Equipment, Voith, Inc.) that has been pre-filled to the appropriate level with water. After pouring the slurry into the mold, the mold is then completely filled with water, including water used to rinse the graduated cylinder. The slurry is then agitated gently with a standard perforated mixing plate that is inserted into the slurry and moved up and down seven times, then removed. The water is then drained from the mold through a wire assembly at the bottom of the mold that retains the fibers to form an embryonic web. The forming wire is a 90×90 mesh, stainless-steel wire cloth. The web is couched from the mold wire with two blotter papers placed on top of the web with the smooth side of the blotter contacting the web. The blotters are removed and the embryonic web is lifted with the lower blotter paper, to which it is attached. The lower blotter is separated from the other blotter, keeping the embryonic web attached to the lower blotter. The blotter is positioned with the embryonic web face up, and the blotter is placed on top of two other dry blotters. Two more dry blotters are also placed on top of the embryonic web. The stack of blotters with the embryonic web is placed in a Valley hydraulic press and pressed for one minute with 100 psi applied to the web. The pressed web is removed from the blotters and placed on a Valley steam dryer containing steam at 2.5 psig pressure and heated for 2 minutes, with the wire-side surface of the web next to the metal drying surface and a felt under tension on the opposite side of the web. Felt tension is provided by a 17.5 lbs of weight pulling downward on an end of the felt that extends beyond the edge of the curved metal dryer surface. The dried handsheet is trimmed to 7.5 inches square with a paper cutter and then weighed in a heated balance with the temperature maintained at 105° C. to obtain the oven dry weight of the web. Flexible sheets are formed that show improved wet tensile strength relative to a control with no chemical.

Example 4

This example illustrates how the condensation polymers of this invention can be used in conjunction with anionic resins such as carboxymethyl cellulose (CMC) to enhance wet strength performance. 50 grams (oven dried basis) of Northern Softwood Kraft fibers is diluted to 2.5% consistency with water, soaked for 5 minutes and dispersed using a British Pulp Disentegrator for 5 minutes.

25 mls of a 1% solution of the chemical of example 2 is added to the thick stock and mixed for 2 minutes using a standard mechanical mixer and moderate sheer. 12.5 grams of a 0.5% aqueous solution of CMC is then added to the thick stock and the slurry is stirred for 2 more minutes under moderate sheer. Handsheets are made with a basis weight of 60 gsm by measuring the appropriate amount of fiber slurry required to make a 60 gsm sheet into a graduated cylinder. The slurry is then poured from the graduated cylinder into a handsheet making mold apparatus, which has been pre-filled to the appropriate level with water. The fibers suspended in the handsheet mold water are then mixed using a perforated plate attached to a handle to uniformly disperse the fibers within the entire volume of the mold. After mixing, the sheet is formed by draining the water in the mold, thus depositing the fibers on the 90×90 mesh forming wire. The sheet is removed from the forming wire using blotters and a couch roll. The wet sheet is then transferred directly to a steam heated, convex surface metal dryer maintained at 213° F. (+2° F.). The sheet is held against the dryer by use of a canvas under tension. The sheet is allowed to dry for 2 minutes on the metal surface, and is then removed. The resultant sheets exhibit good flexibility and improved wet and dry strength over an untreated control.

It will be appreciated that the foregoing examples, given for purposes of illustration, are not to be construed as limiting the scope of this invention, which is defined by the following claims and all equivalents thereto.

We claim:

1. A tissue or towel sheet containing from about 0.01 to about 3 dry weight percent of a condensation polymer comprising the reation product of two or more reactant compounds which include an amphiphilic difunctional polyoxyalkylene compound and a difunctional polyalkylene compound, said difunctional polyalkylene compound having at least one unreacted secondary amine group, wherein at least a portion of the secondary amine groups in the resulting condensation polymer have been reacted to incorporate groups capable of forming covalent bonds with cellulose or with other polymer molecules.

2. The tissue or towel sheet of claim 1 wherein the groups capable of forming covalent bonds with cellulose or with other polymer molecules is selected from the group consisting of hydroxyazetidinium, silanol, epoxy and mixtures thereof.

3. The tissue or towel sheet of claim 1 wherein from about 10 to about 50 percent of the secondary amine groups have been reacted to incorporate groups capable of forming covalent bonds either with cellulose or with other polymer molecules.

4. The tissue or towel sheet of claim 1 wherein the reactant compounds further include a difunctional saturated aliphatic hydrocarbon or a difunctional ether.

5. The tissue or towel sheet of claim 4 wherein the difunctional saturated aliphatic hydrocarbon or ether is a dibasic acid of a linear or branched, substituted or non-substituted aliphatic hydrocarbon or ether having from 2 to 24 carbons.

6. The issue or towel sheet of claim 4 wherein difunctional saturated aliphatic hydrocarbon is selected from the group consisting of adipic acid, malic acid, malonic acid, glutaric acid, oxalic acid, succinic acid, methyl malonic acid, citramalic acid, 2-methylglutaric acid, 3-methylglutaric acid, dimethylglutaric acid, pimelic acid, suberic acid, azelaic acid, sebacic acid, undecanedioc acid, dodecanedioc acid, 1,12-dodecanedicarboxylic acid, hexadecanedioc acid, octadecanedioc acid, dodecyldioic acid, diglycolic acid, their corresponding methyl and ethyl esters, acid chlorides and mixtures of said compounds.

7. The tissue or towel sheet of claim 4 wherein the difunctional saturated aliphatic hydrocarbon or ether is adipic acid and the difunctional polyalkylene compound containing at least one unreacted secondary amine group is diethylene triamine.

8. The tissue or towel sheet of claim 1 wherein the amphiphilic difunctional polyoxyalkylene compound has the following structure:

$$Z^5\text{---}(CHCH_2O)_{\overline{a}}\text{---}[(CH_2)_xO]_{\overline{b}}\text{---}(CH_2CH)_{\overline{c}}\text{---}Z^6$$
$$\underset{R^5}{|} \qquad \underset{R^6}{|}$$

wherein:
Z$^5$ and Z$^6$ are functional groups, which can be the same or different, such that each Z-group must be capable of reacting with at least one other Z-group in order to incorporate the R-group functionality into the molecule;
R$^5$, R$^6$=independently H, CH$_3$;
a, b, c$\geq$0;
a+b+c$\geq$2; and
x=2 to 6.

9. The tissue or towel sheet of claim 8 wherein Z$^5$ and Z$^6$ are selected from the group consisting of:
—COOH, —COOR$^4$, —COX, —OCH$_2$COOH, —OCH$_2$COOR$^4$, —OCH$_2$COX, —NH$_2$, —OH, —SH, —OCOX, —OCOOR$^4$, —CN, and —NCO;
wherein R$^4$=methyl or ethyl and "X"=halogen.

10. The tissue or towel sheet of claim 1 wherein the difunctional polyalkylene compound containing at least one unreacted secondary amine group has the general structure:

$$Z^7\text{---}(C_nH_{2n}NH)_x\text{---}C_nH_{2n}\text{---}Z^8$$

wherein
Z$^7$ and Z$^8$ are functional groups, which can be the same or different, such that each Z-group must be capable of reacting with at least one other Z-group in order to incorporate the R-group functionality into the molecule; and
where "n" is an integer of 2 or greater and "x" is an integer of 1 or greater.

11. The tissue or towel sheet of claim 10 wherein Z$^7$ and Z$^8$ are selected from the group consisting of: —COOH, —COOR$^4$, —OCH$_2$COOH, —OCH$_2$COOR$^4$, —NH$_2$, —OH, —SH, —OCOOR$^4$, —CN, and —NCO;
wherein R$^4$=methyl or ethyl.

12. The tissue or towel sheet of claim 10 wherein Z$^7$ and Z$^8$ are —NH$_2$.

13. The tissue or towel sheet of claim 10 wherein Z$^7$ and Z$^8$ are —OCH$_2$COOH.

14. The tissue or towel sheet of claim 1 wherein the difunctional polyalkylene compound containing at least one unreacted secondary amine group is selected from the group consisting of:

NH$_2$—(C$_n$H$_{2n}$NH)$_x$—H

NH$_2$CH$_2$CH$_2$NHCH$_2$CH$_2$NH$_2$

HOOCCH$_2$NHCH$_2$COOH

HOCH$_2$CH$_2$NHCH$_2$CH$_2$OH

NH$_2$CH$_2$CH$_2$NHCH$_2$CH$_2$OH

HOOCCH$_2$CH$_2$NHCH$_2$CH$_2$COOH

NH$_2$CH$_2$CH$_2$NHCH$_2$CH$_2$NHCH$_2$CH$_2$NH

HN(CH$_2$CH$_2$CN)$_2$ wherein "n" and "x" are integers of 2 or more.

15. A tissue or towel sheet comprising from about 0.01 to about 3 dry weight percent of a condensation polymer having the following structure:

$$\text{---}\{(Z^1\text{---}R^1)_{\overline{a}}(Z^2\text{---}R^2)_{\overline{b}}(Z^3\text{---}R^3)_{\overline{c}}\}_w\text{---}$$

where
a, b, w$\geq$1;
c$\geq$0;
Z$^1$, Z$^2$, Z$^3$=bridging radicals which incorporate the R$^1$, R$^2$, and R$^3$ groups into the polymer;
R$^1$=an amphiphilic hydrocarbon residue derived from a polyether;
R$^2$=a linear or branched, saturated or unsaturated, substituted or non-substituted aliphatic hydrocarbon residue containing at least one secondary amine group wherein at least a portion of the secondary amine groups have been reacted to incorporate groups capable of forming covalent bonds with cellulose or with other polymer molecules; and
R$^3$=a linear or branched, substituted or non-substituted, aliphatic hydrocarbon residue having from about 1 to 24 carbon atoms.

16. The tissue or towel sheet of claim 15 wherein the amphiphilic hydrocarbon residue (R$^1$) has the following structure:

$$\text{---}(CHCH_2O)_{\overline{a}}\text{---}[(CH_2)_xO]_{\overline{b}}\text{---}(CH_2CH)_{\overline{c}}\text{---}$$
$$\underset{R^5}{|} \qquad \underset{R^6}{|}$$

where:
R$^5$, R$^6$=independently H or CH$_3$;
a, b, c$\geq$0;
a+b+c$\geq$2; and
x=2 to 6.

17. The tissue or towel sheet of claim 15 wherein the bridging radicals are selected from the group consisting of —OOC—, —COO—, —NHCO—, —OCNH—, —O—, —S—, —CONHCO—, —NCOO—, —OSO$_2$O—, OCOO, and —OOC—Ar—O—, wherein "Ar" is an aryl group.

18. The tissue or towel sheet of claim 15 wherein the aliphatic hydrocarbon residue containing at least one secondary amine group ($R^2$) has the structure:

$$-(C_nH_{2n}NH)_x-C_nH_{2n}-$$

wherein "n" and "x" are integers of 2 or more.

* * * * *